United States Patent
Ota

(10) Patent No.: US 6,714,847 B2
(45) Date of Patent: Mar. 30, 2004

(54) COLLISION DETECTING APPARATUS FOR VEHICLE

(75) Inventor: Atsuo Ota, Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/244,399

(22) Filed: Sep. 17, 2002

(65) Prior Publication Data

US 2003/0074137 A1 Apr. 17, 2003

(30) Foreign Application Priority Data

Sep. 18, 2001 (JP) ........................................ 2001-283692

(51) Int. Cl.[7] .................. B60R 22/00; E05F 15/00; G05D 1/00; G05D 3/00; G06F 17/00

(52) U.S. Cl. .................. 701/46; 701/45; 701/47; 701/300; 701/301; 280/374; 280/375; 280/734; 280/735; 180/167; 180/168; 180/232; 180/268; 180/271; 180/272; 180/274; 180/734; 180/735; 180/282; 340/436; 340/669; 307/10.1

(58) Field of Search .................. 701/46, 45, 47, 701/301, 300; 340/436, 903, 669; 180/271, 274, 232, 735, 734, 268, 282, 438, 272, 167, 168; 307/10.1; 280/735, 734, 374, 375

(56) References Cited

U.S. PATENT DOCUMENTS

| | | | | |
|---|---|---|---|---|
| 5,440,485 A | * | 8/1995 | Okimoto et al. | 701/46 |
| 5,483,451 A | * | 1/1996 | Ohmae et al. | 701/46 |
| 5,490,067 A | | 2/1996 | Teguri et al. | |
| 5,541,842 A | | 6/1996 | Gioutsos et al. | |
| 5,555,174 A | * | 9/1996 | Okimoto et al. | 701/46 |
| 5,631,834 A | * | 5/1997 | Tsurushima et al. | 701/45 |
| 5,667,244 A | * | 9/1997 | Ito et al. | 280/735 |
| 5,787,377 A | * | 7/1998 | Watanabe et al. | 701/45 |
| 6,125,313 A | * | 9/2000 | Watanabe et al. | 701/45 |
| 6,219,606 B1 | * | 4/2001 | Wessels et al. | 701/45 |
| 6,330,500 B1 | * | 12/2001 | Moriyama et al. | 701/45 |
| 6,430,489 B1 | * | 8/2002 | Dalum | 701/45 |
| 6,483,454 B1 | * | 11/2002 | Torre et al. | 342/30 |
| 2003/0065431 A1 | * | 4/2003 | Ota | 701/45 |
| 2003/0069678 A1 | * | 4/2003 | Ota | 701/45 |

FOREIGN PATENT DOCUMENTS

| | | |
|---|---|---|
| DE | 199 13 906 A1 | 10/1999 |
| JP | 4-176757 | 6/1992 |
| JP | 4-176757 A | 6/1992 |
| JP | 11-278342 | 10/1999 |
| JP | 11-278342 A | 10/1999 |
| WO | WO 00/13944 | 3/2000 |

* cited by examiner

Primary Examiner—Yonel Beaulieu
Assistant Examiner—Marc McDieunel
(74) Attorney, Agent, or Firm—Birch, Stewart, Kolasch & Birch, LLP

(57) ABSTRACT

To provide a collision detecting apparatus for a vehicle, including an integrating apparatus for cumulatively integrating an output from the acceleration sensor when the output exceeds a specific calculation start level, and a collision detecting apparatus for outputting a collision signal when a cumulative integral value calculated by the integrating apparatus exceeds a threshold value. The collision detecting apparatus is intended to accurately perform a collision decision with a high responsiveness irrespective of the severeness of the collision. The collision detecting apparatus includes a differentiating apparatus D for differentiating the output G from the acceleration sensor S, and a correcting apparatus H for correcting the threshold value α on the basis of a differential value (dG/dt) calculated by the differentiating apparatus D.

20 Claims, 5 Drawing Sheets

COLLISION DETECTING APPARATUS FOR VEHICLE

BACKGROUND OF THE INVENTION

CROSS-REFERENCE TO RELATED APPLICATIONS

The present application claims priority under 35 USC 119 to Japanese Patent Application No. 2001-283692 filed on Sep. 18, 2001 the entire contents thereof is hereby incorporated by reference.

1. Field of the Invention

The present invention relates to a collision detecting apparatus for a vehicle, which outputs a collision signal for initiating a passenger protector for a vehicle, such as an air bag, upon collision of the vehicle.

2. Description of Background Art

With respect to a collision detecting apparatus to which the present invention pertains, as described in Japanese Patent Laid-open No. Hei 4-176757, a type of collision detecting apparatus is known that includes an integrating means for cumulatively integrating the output from an acceleration sensor when the output exceeds a specific calculation start level due to a collision of the vehicle. The collision detecting apparatus outputs a collision signal when a cumulative integral value calculated by the integrating means exceeds a specific threshold value.

Many types of collision apparatus for a vehicle exist depending on the collision state. For example, a usual collision apparatus is available wherein a deceleration, that is, a negative acceleration of the vehicle is gradually increased on the negative side due to an impact absorbing effect caused by deformation or breakage of the vehicle or an object against which the vehicle is collided immediately after collision (hereinafter, referred to simply as "usual collision"). In addition, a severe collision apparatus is available wherein a large deceleration, that is, a negative acceleration abruptly occurs for a very short time due to the fact that a small absorption of the impact occurs immediately after collision for some cases (hereinafter, referred to simply as "rigid collision").

For example, in the case of a motorcycle representative of the vehicle, an acceleration sensor is often mounted on a leading end portion of a front fork as shown in FIG. 5 (see Japanese Patent Laid-open No. Hei 11-278342). When a front wheel of the motorcycle collides against a relatively low rigid wall as shown in FIG. 5, a small amount of the impact energy is absorbed in the vehicular body, to cause the "rigid collision". On the other hand, when a portion, located at a relatively high position, of the motorcycle collides against a counter-vehicle and thereby both the vehicles are deformed or broken, an impact energy is absorbed by an impact absorbing effect due to the deformation or breakage of the vehicles, to cause the "usual collision."

According to a related art vehicle, however, since the threshold value is set to a constant value corresponding to the "usual collision," even if a large deceleration rapidly occurs immediately after collision in the case of the "rigid collision," any collision signal is not outputted unless a cumulative integral value of the output from the acceleration sensor reaches the threshold value, to cause an inconvenience that the collision decision and thereby the operation of a passenger protector is retarded.

SUMMARY AND OBJECTS OF THE INVENTION

In view of the foregoing, the present invention has been made. It is an object of the present invention to provide a collision detecting apparatus for a vehicle that is capable of solving the above-described problem of the related art apparatus by accurately performing a collision decision with a high responsiveness irrespective of the state and severeness of the collision.

To achieve the above object, according to the present invention, there is provided a collision detecting apparatus for a vehicle including an acceleration sensor for detecting an acceleration upon collision of the vehicle, integrating means for cumulatively integrating an output from the acceleration sensor when the output exceeds a specific calculation start level, and collision detecting means for outputting a collision signal when a cumulative integral value calculated by the integrating means exceeds a threshold value. The collision detecting apparatus includes differentiating means for differentiating the output from the acceleration sensor and correcting means for correcting the threshold value on the basis of a differential value calculated by the differentiating means.

With this configuration, in the case of a usual collision in which an impact absorbing effect due to deformation of the vehicular body or the like can be somewhat expected, a collision signal is outputted from the collision detecting means when the cumulative integral value calculated by the integrating means exceeds a threshold value. Meanwhile, in the case of a rigid collision in which a deceleration (negative acceleration) of the vehicular body rapidly occurs, as an absolute value of the output differential value from the acceleration sensor becomes larger, the threshold value can be corrected so as to make the detecting sensitivity of the collision detecting means higher, so that a collision signal can be quickly outputted from the collision detecting means on the basis of the corrected threshold value. Accordingly, for the rigid collision, a collision decision can be quickly performed. As a result, since the collision decision can be accurately performed with a high responsiveness irrespective of the state of collision (that is, even if a deceleration is rapidly raised), the starting time of a passenger protector can be optimally controlled on the basis of the collision decision at any time.

According to the present invention, the correcting means stores the usual threshold value and a correction threshold value set on the side to make a detecting sensitivity of the collision detecting means higher than that for the usual threshold value, and the correcting means performs the correction by selecting the correction threshold value in place of the usual threshold value when the differential value exceeds a specific value. With this configuration, it is possible to correct the threshold value without the need of any special calculation, and hence to simplify the control.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Hereinafter, embodiments of the present invention will be described in detail with reference to the accompanying drawings.

Figure 1:
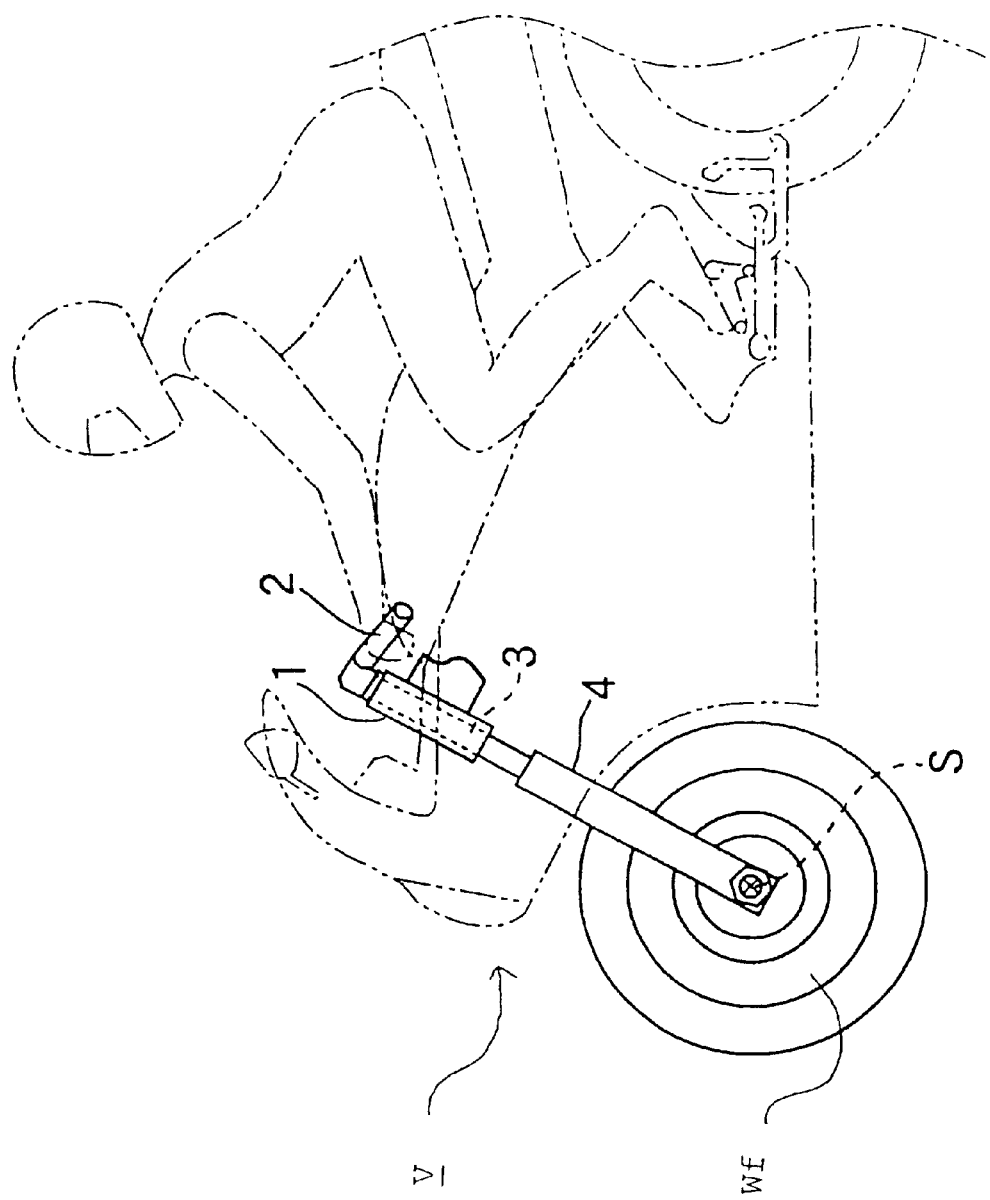
FIG. 1 is a schematic view showing the entire configuration of a motorcycle to which the present invention is applied.

Referring first to FIG. 1, a motorcycle V is illustrated that is representative of a vehicle to which the present invention is applied. A head pipe 1 is fixed to a front body of the motorcycle V, and a steering shaft 3 is turnably fitted to and supported by the head pipe 1. A steering handlebar 2 is connected to the upper end of the steering shaft 3, and a base end portion of a front fork 4 is fixed to the lower end of the steering shaft 3. A front wheel Wf is rotatably supported by a leading end portion of the front fork 4. An acceleration sensor S, for detecting an acceleration applied to the vehicle when the motorcycle V is in a collision, is fixed to the leading end portion of the front fork 4 or in the vicinity of the front fork 4 (front axle in the example shown in the FIG. 1). It is to be noted that the structure of mounting the sensor S to the front fork 4 is the same as a known structure described, for example, in Japanese Patent Laid-open No. Hei 11-278342, and the description thereof is omitted.

An output G (for example, an output voltage) of the acceleration sensor S corresponds to a value of an acceleration to be detected. A positive (+) value of the output G means a positive acceleration, and a negative (−) value of the output G means a negative acceleration (that is, a deceleration). Immediately after a collision of the vehicle, as shown in FIG. 3, a negative output G indicating a deceleration outputted from the acceleration sensor S is changed so as to be raised on the negative side (lower than zero on the graph of FIG. 3).

Figure 2:
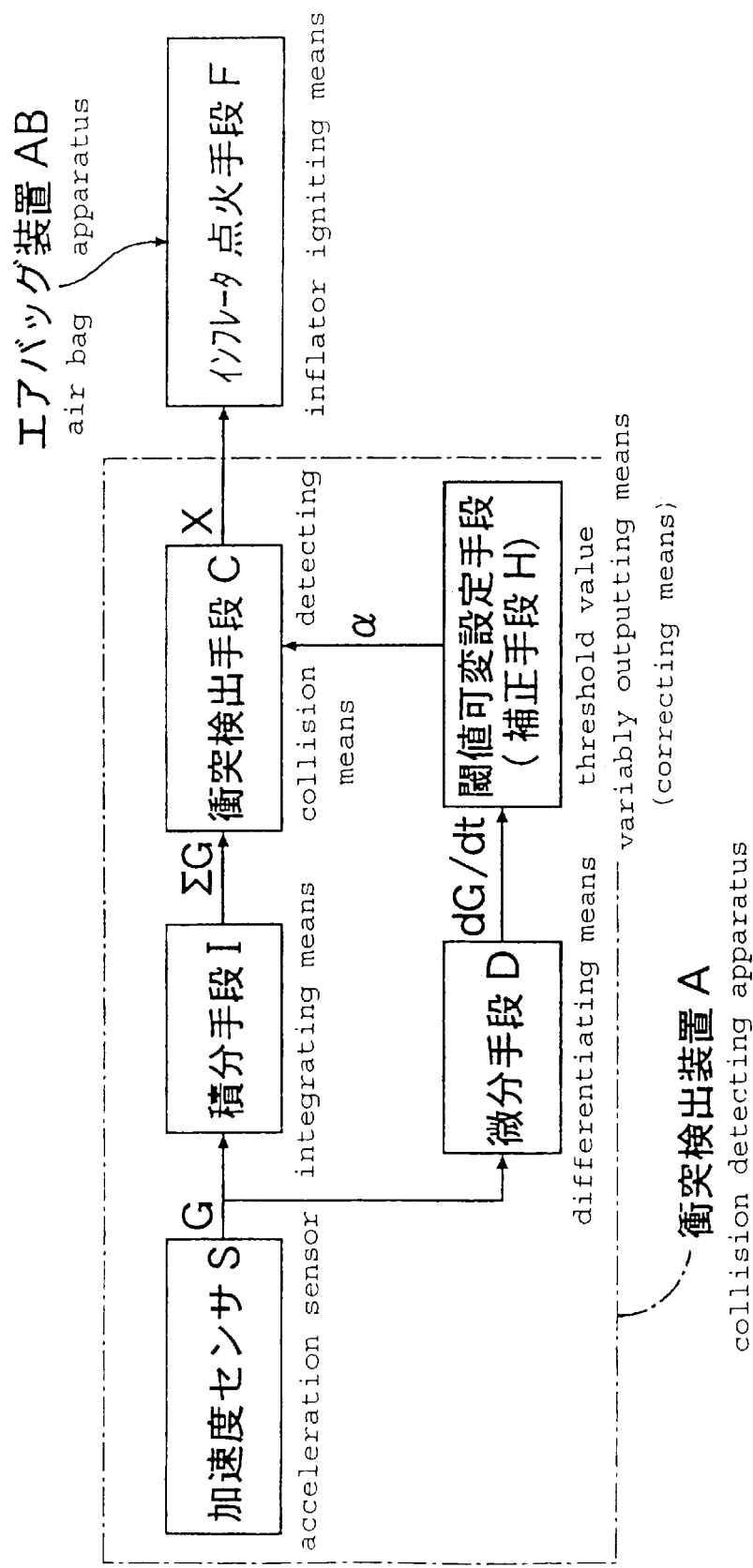
FIG. 2 is a control block diagram according to the present invention.

An air bag apparatus AB (FIG. 2) as a passenger protector is disposed at an appropriate position on the front of the motorcycle V. Like a known air bag apparatus, the apparatus AB includes an inflator igniting means F, an inflator (not shown) ignited by starting the ignition means F, and an air bag (not shown) expanded by a gas blown from the inflator so as to protect a passenger. The inflator igniting means F starts in response to a collision signal X outputted from a collision detecting apparatus A (to be described later) upon collision of the vehicle, to ignite the inflator.

The collision detecting apparatus A includes the above-described acceleration sensor S, an integrating means I, and a collision detecting means C. The integrating means I is adapted for cumulatively integrating the output G from the acceleration sensor S when the output G exceeds a specific calculation start level $G_0$. The collision detecting means C is adapted for outputting a collision signal when a cumulative integral value $\Sigma G$ calculated by the integrating means I exceeds a threshold value $\alpha$. In this embodiment, the collision detecting apparatus A further includes a differentiating means D and a threshold value variably outputting means H as a correcting means. The differentiating means D is adapted for differentiating the output G from the acceleration sensor S. The threshold value variably outputting means H is adapted for correcting, as the absolute value of a differential value dG/dt calculated by the differentiating means D becomes higher, the threshold value $\alpha$ so as to make a detecting sensitivity of the collision detecting means C higher (on the upper side of a graph of FIG. 3). It is to be noted that most of the components, except the acceleration sensor S, of the collision detecting apparatus A can be controlled by an electronically-controlled unit such as a micro-computer provided at an appropriate position of the vehicular body.

Figure 3:
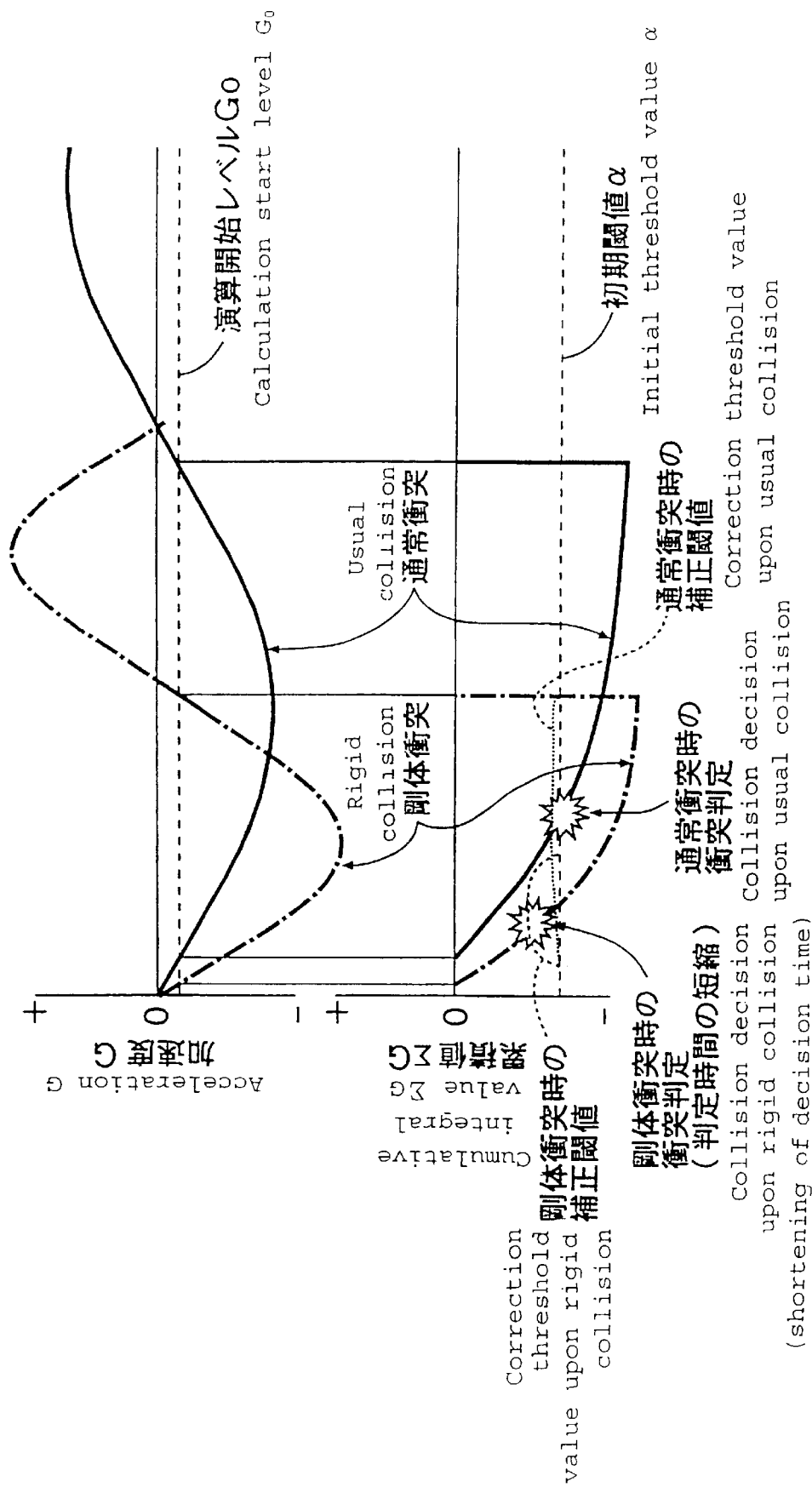
FIG. 3 is a timing chart showing a change state of each of an acceleration and a cumulative acceleration after collision in a first embodiment of the present invention.

As is apparent from FIG. 3, in a state immediately after collision of the vehicle, since a negative acceleration, that is, a deceleration is applied to the vehicle, the output G from the acceleration sensor S is negative, so that the output differential value dG/dt and the cumulative integral value $\Sigma G$ become negative, and correspondingly, the calculation start level $G_0$ and the threshold value $\alpha$ are set to negative values. In addition, the differential value dG/dt is equivalent to the gradient (downward gradient in the state of generating a deceleration) of the curve of the output G shown in FIG. 3.

In this embodiment, the threshold value variably outputting means H corrects the initial threshold value $\alpha$ on the basis of the output differential value dG/dt by subtracting the output differential value dG/dt from the constant initial threshold value $\alpha$, that is, on the basis of an equation of ($\alpha$−dG/dt), and outputs the corrected threshold value to the collided detecting means C.

The function of this embodiment will be described below. Upon collision of the vehicle, the acceleration sensor S is operated. When the output G from the acceleration sensor S exceeds the specific calculation start level $G_0$, the integrating means I starts the cumulative integration of the output G. When the cumulative integral value $\Sigma G$ calculated by the integrating means I exceeds the threshold value ($\alpha$−dG/dt) on the negative side (lower than zero in the graph of FIG. 3), the collision detecting means C outputs the collision signal X to the inflator igniting means F. As a result, the inflator starts to rapidly generate a gas to abruptly expand the air bag, thereby protecting a passenger from the impact caused by the collision of the vehicle.

If the collision of the vehicle is a usual collision in which an impact absorbing effect due to deformation of the vehicular body or the like is somewhat expected, a negative acceleration, that is, a deceleration of the vehicular body is relatively moderately raised on the negative side (lower than zero of FIG. 3), so that the output differential value dG/dt equivalent to the gradient of the curve indicating the change in deceleration is relatively small. Accordingly, a corrected amount of the initial threshold value $\alpha$ becomes small, with a result that the cumulative integral value $\Sigma G$ exceeds the threshold value ($\alpha$−dG/dt) with a timing optimum for the usual collision.

Meanwhile, in the case of a rigid collision in which a negative acceleration, that is, a deceleration of the vehicle rapidly occurs on the negative side (lower than zero in the graph of FIG. 3), the output differential value dG/dt becomes relatively large, so that the corrected amount of the initial threshold value $\alpha$ becomes large. Accordingly, the cumulative integral value $\Sigma G$ exceeds the threshold value ($\alpha$−dG/dt) with a timing optimum for the rigid collision. In this way, for a rigid collision, since the corrected amount of the initial threshold value α becomes large relative to that for the usual collision, it is possible to quickly perform a collision decision. Accordingly, the collision decision can be accurately performed with a high responsiveness irrespective of the state and severeness of the collision (that is, even if the deceleration is rapidly raised), with a result that the starting time of the air bag apparatus AB can be optimally controlled on the basis of the collision decision at any time.

In addition, when after start of the cumulative integration, the output G from the acceleration sensor S returns to the calculation start level $G_0$ until the cumulative integral value ΣG exceeds the threshold value, the cumulative integral value ΣG is reset, to stop the cumulative integration.

Figure 4:
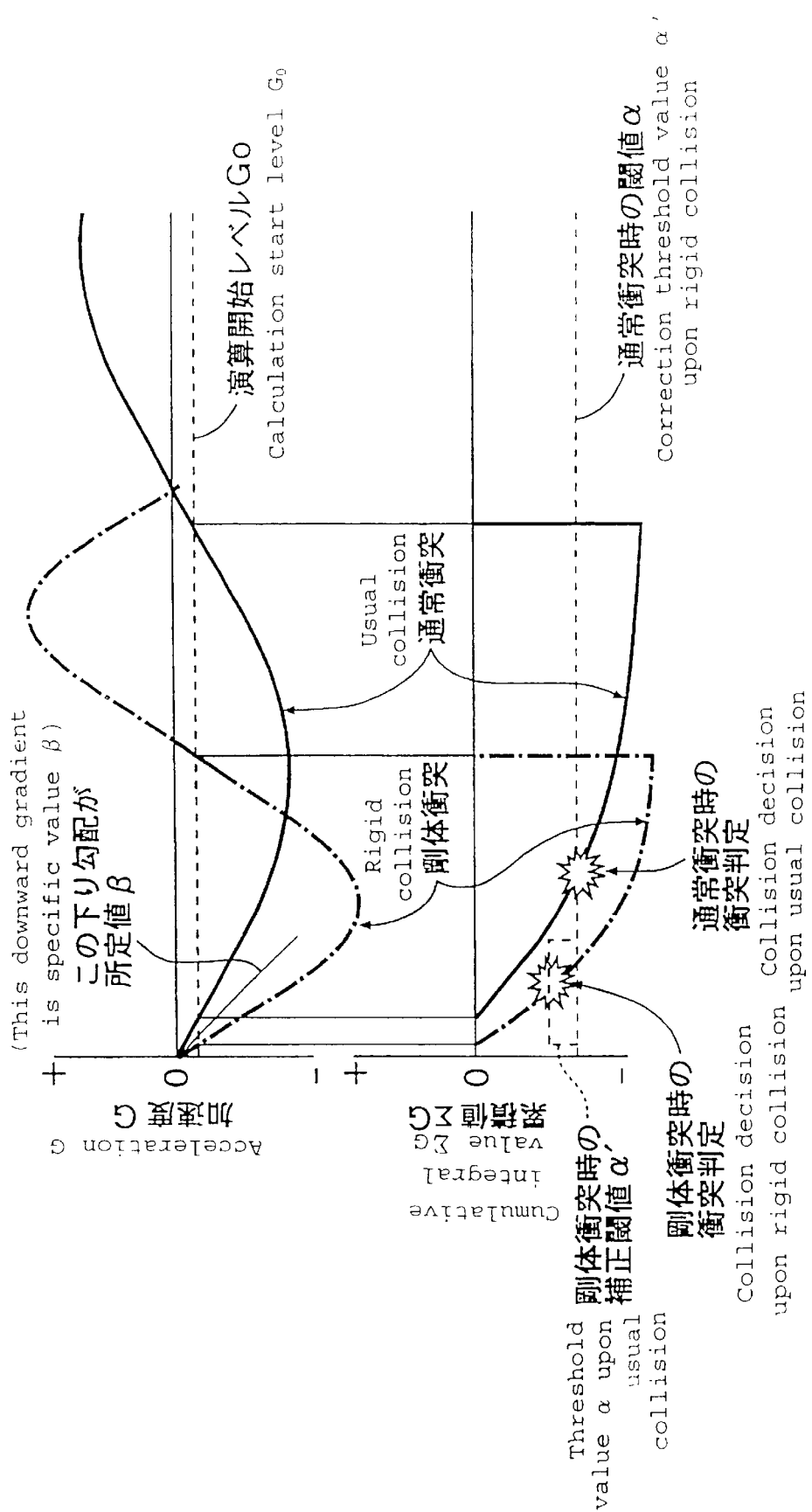
FIG. 4 is a timing chart showing a change state of each of an acceleration and a cumulative acceleration after collision in a second embodiment of the present invention.
Figure 5:
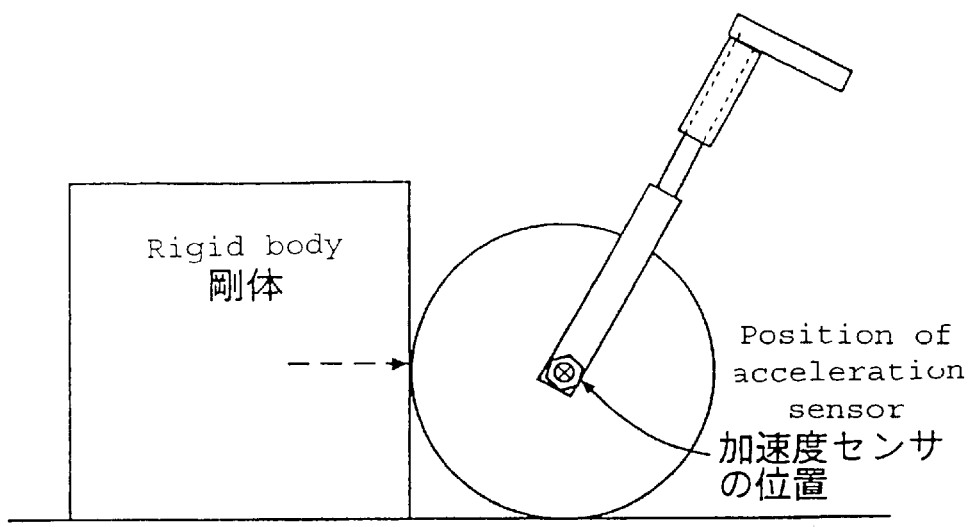
FIG. 5 is a diagram illustrating states of usual collision and rigid collision of the motorcycle.

FIG. 4 is a second embodiment of the present invention. In this embodiment, a threshold value variably outputting means H as a correcting means for correcting the threshold value α on the basis of the output differential value dG/dt from the differentiating means D stores the usual threshold value α, and a correction threshold value α' set to make the detecting sensitivity of the collision detecting means C higher than for the usual threshold value α (on the upper side of a graph in FIG. 4). For the usual collision in which the output differential value dG/dt from the acceleration sensor S does not exceeds a specific value β, the threshold value variably outputting means H outputs the usual threshold value α to the collision detecting means C, and for the rigid collision, when the output differential value dG/dt from the acceleration sensor S exceeds the specific value β, the threshold value variably outputting means H selects the correction threshold value α' in place of the usual threshold value α, and outputs the correction threshold value α' to the collision detecting means C.

According to this embodiment, since the threshold value variably outputting means H previously sets and stores the usual threshold value α corresponding to the usual collision of the vehicle and at least one correction threshold value α' corresponding to the rigid collision of the vehicle, it is possible to correct the threshold value without the need of any special calculation as in the first embodiment, and hence to simplify the control.

While the embodiments of the present invention have been described in detail, the present invention is not limited thereto, and it is to be understood that various changes in design may be made without departing from the scope of the present invention.

In the embodiments, the vehicle to which the present invention is applied is configured as a motorcycle liable to cause the rigid collision. However, since even a four-wheeled vehicle may possibly cause the rigid collision depending on an operating state of the vehicle, the present invention is applicable to a four-wheeled vehicle.

As described above, according to the present invention, upon collision of a vehicle, for the rigid collision in which a large deceleration rapidly occurs, the threshold value to a cumulative integral value calculated by the integrating means can be corrected on the basis of the output differential value from the acceleration sensor so as to make the collision detecting sensitivity higher, so that the collision decision can be performed earlier than that for the usual collision. As a result, it is possible to accurately perform the collision decision with a high responsiveness irrespective of the state and severeness of the collision, and hence to optimally control the starting time of a passenger protector.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A collision detecting apparatus for a vehicle comprising:
    an acceleration sensor (S) for detecting an acceleration upon collision of said vehicle;
    integrating means (I) for cumulatively integrating an output (G) from said acceleration sensor (S) when the output (G) exceeds a specific calculation start level ($G_0$); and
    collision detecting means (C) for outputting a collision signal (X) when a cumulative integral value (ΣG) calculated by said integrating means (I) exceeds a threshold value (α);
    said collision detecting apparatus comprising:
        differentiating means (D) for differentiating the output (G) from said acceleration sensor (S); and
        correcting means (H) for correcting the threshold value (α) on the basis of a differential value (dG/dt) calculated by said differentiating means (D),
        wherein as an absolute value of a differential value (dG/dt) calculated by the differentiating means becomes higher, the threshold value (α) is corrected for making a detecting sensitivity of the collision detecting means (c) higher.

2. The collision detecting apparatus for a vehicle according to claim 1, wherein said correcting means (H) stores the usual threshold value (α) and a correction threshold value (α') set on the side to make a detecting sensitivity of said collision detecting means (C) higher than that for the usual threshold value (a), and said correcting means (H) performs the correction by selecting the correction threshold value (α') in place of the usual threshold value (α) when the differential value (dG/dt) exceeds a specific value.

3. The collision detecting apparatus for a vehicle according to claim 1, wherein the correcting means provides a variable threshold valve output.

4. The collision detecting apparatus for a vehicle according to claim 1, wherein the detected acceleration is negative, the output differential value dG/dt is negative and the cumulative integral value ΣG is negative to correspondingly calculate the start level and the threshold value a as negative values.

5. The collision detecting apparatus for a vehicle according to claim 1, wherein the correcting means corrects the initial threshold value a on the basis of the output differential value dG/dt based on α−dG/dt.

6. The collision detecting apparatus for a vehicle according to claim 1, wherein in a usual collision of the vehicle the cumulative integral value ΣG exceeds the threshold value α−dG/dt with a first predetermined timing.

7. The collision detecting apparatus for a vehicle according to claim 1, wherein in a rigid collision of the vehicle the cumulative integral value ΣG exceeds the threshold value α−dG/dt with a second predetermined timing for providing an optimal control for actuating an air bag.

8. The collision detecting apparatus for a vehicle according to claim 1, wherein the output value from the differentiating means stores the threshold value α and a correction threshold value α' set to make a detecting sensitivity of the collision detecting means higher than the usual threshold value α.

9. The collision detecting apparatus for a vehicle according to claim 8, wherein during a usual collision the output differential value dG/dt does not exceed a specific value β the threshold value differentiating means outputs the usual threshold value $\alpha$.

10. The collision detecting apparatus for a vehicle according to claim 8, wherein during a rigid collision the output differential value dG/dt exceeds a specific value $\beta$ the threshold value differentiating means outputs the correction threshold value $\alpha'$.

11. A method of detecting a collision of a vehicle comprising the following steps:

detecting an acceleration upon collision of a vehicle;

cumulatively integrating an output (G) from an acceleration sensor (S) when the output (G) exceeds a specific calculation start level ($G_0$);

outputting a collision signal (X) when a cumulative integral value ($\Sigma G$) calculated by said integrating step exceeds a threshold value ($\alpha$);

differentiating the output (G) from said acceleration sensor (S); and correcting the threshold value ($\alpha$) on the basis of a differential value (dG/dt) calculated by said differentiating steps, wherein an output value from the differentiating step stores the threshold value (a) and a correction threshold value ($\alpha'$) set to make a detecting sensitivity of the collision detecting step higher than the usual threshold value ($\alpha$).

12. The method of detecting a collision of a vehicle according to claim 11, wherein said correcting step stores the usual threshold value ($\alpha$) and a correction threshold value ($\alpha'$) set on the side to make a detecting sensitivity of said collision detecting step higher than that for the usual threshold value ($\alpha$), and said correcting step performs the correction by selecting the correction threshold value ($\alpha'$) in place of the usual threshold value ($\alpha$) when the differential value (dG/dt) exceeds a specific value.

13. The method of detecting a collision of a vehicle according to claim 11, wherein the correcting step provides a variable threshold valve output.

14. The method of detecting a collision of a vehicle according to claim 11, wherein as the absolute value of a differential value dG/dt calculated by the differentiating step becomes higher, the threshold value a is corrected for making a detecting sensitivity of the collision detecting step higher.

15. The method of detecting a collision of a vehicle according to claim 11, wherein the detected acceleration is negative, the output differential value dG/dt is negative and the cumulative integral value $\Sigma G$ is negative to correspondingly calculate the start level and the threshold value a as negative values.

16. The method of detecting a collision of a vehicle according to claim 11, wherein the correcting step corrects the initial threshold value a on the basis of the output differential value dG/dt based on $\alpha$–dG/dt.

17. The method of detecting a collision of a vehicle according to claim 11, wherein in a usual collision of a vehicle the cumulative integral value $\Sigma G$ exceeds the threshold value $\alpha$–dG/dt with a first predetermined timing.

18. The method of detecting a collision of a vehicle according to claim wherein in a rigid collision of a vehicle the cumulative integral value $\Sigma G$ exceeds the threshold value $\alpha$–dG/dt with a second predetermined timing for providing an optimal control for actuating an air bag.

19. The method of detecting a collision of a vehicle according to claim 11, wherein during a usual collision the output differential value dG/dt does not exceed a specific value $\beta$ the threshold value differentiating step outputs the usual threshold value $\alpha$.

20. The method of detecting a collision of a vehicle according to claim 11, wherein during a rigid collision the output differential value dG/dt exceeds a specific value $\beta$ the threshold value differentiating step outputs the correction threshold value.

* * * * *